United States Patent [19]

Morris et al.

[11] 4,414,382

[45] Nov. 8, 1983

[54] COPOLYESTERS DERIVED FROM 2,6-NAPHTHALENEDICARBOXYLIC ACID, TRANS-4,4'-STILBENEDICARBOXYLIC ACID AND ETHYLENE GLYCOL

[75] Inventors: John C. Morris; Winston J. Jackson, Jr., both of Kingsport, Tenn.

[73] Assignee: Eastman Kodak Company, Rochester, N.Y.

[21] Appl. No.: 429,896

[22] Filed: Sep. 30, 1982

[51] Int. Cl.$^3$ .................... C08G 63/18; C08G 63/54
[52] U.S. Cl. .................................. 528/298; 528/299; 528/302; 528/303; 528/304; 528/305; 528/306
[58] Field of Search ............. 528/298, 29, 303, 305, 528/302, 304, 306, 191, 194, 192

[56] References Cited

U.S. PATENT DOCUMENTS

| | | | |
|---|---|---|---|
| 3,293,223 | 12/1966 | Duling | 528/298 |
| 3,627,758 | 12/1971 | Basel et al. | 528/298 |
| 3,842,040 | 10/1974 | Browne et al. | 528/176 |
| 4,101,528 | 7/1978 | Knopka | 528/298 |

*Primary Examiner*—Lester L. Lee
*Attorney, Agent, or Firm*—William P. Heath, Jr.; Daniel B. Reece, III

[57] ABSTRACT

Copolyesters of poly(ethylene 2,6-naphthalenedicarboxylate) modified with about 15 to 45 mol % trans-4,4'-stilbenedicarboxylic acid can be injection molded to give polymers with tensile strengths up to 32,000 psi and moduli up to 1,250,000 psi. As-spun or drawn fibers and films of poly(ethylene 2,6-naphthalenedicarboxylate) modified with as little as 10 mol % trans-4,4'-stilbenedicarboxylic acid have improved modulus compared with unmodified poly(ethylene 2,6-naphthalenedicarboxylate). The copolyesters have properties superior to those of poly(ethylene terephthalate).

4 Claims, 2 Drawing Figures

EFFECT OF TRANS-4,4'-STILBENEDICARBOXYLIC ACID CONTENT ON THE FLEXURAL MODULUS OF INJECTION MOLDED POLY(ETHYLENE 2,6-NAPHTHALATEDICARBOXYLATE)

EFFECT OF TRANS-4,4'-STILBENEDICARBOXYLIC ACID CONTENT ON THE TENSILE STRENGTH OF INJECTION MOLDED POLY(ETHYLENE 2,6-NAPHTHALATEDICARBOXYLATE)

COPOLYESTERS DERIVED FROM 2,6-NAPHTHALENEDICARBOXYLIC ACID, TRANS-4,4'-STILBENEDICARBOXYLIC ACID AND ETHYLENE GLYCOL

This invention relates to copolyesters of high molecular weight useful as films, fibers and molding plastics. It is particularly concerned with copolyesters of 2,6-naphthalenedicarboxylic acid, trans-4,4'-stilbenedicarboxylic acid and ethylene glycol.

This invention provides molding plastics with superior strength and stiffness to those of poly(ethylene terephthalate) or poly(ethylene 2,6-naphthalenedicarboxylate). Fibers and films made from the copolyesters of this invention are characterized by high tensile strength and exceptionally high modulus.

Homopolyesters of stilbenedicarboxylic acid, 2,6-naphthalenedicarboxylic acid and ethylene glycol are disclosed in U.S. Pat. No. 3,842,040, column 2, lines 10 to 20 and lines 45 and 53. No stilbenedicarboxylic acid/2,6-naphthalenedicarboxylic acid copolyester examples are given.

In U.S. Pat. No. 3,190,764, column 3, lines 25–35 and in U.S. Pat. No. 3,247,043, column 2, lines 24–37, polyesters containing stilbenedicarboxylic acid are disclosed, but no examples are given. U.S. Pat. No. 2,657,195 broadly discloses polymers prepared from aromatic dicarboxylic acids, various isomeric stilbenedicarboxylic acids and ethylene glycol. No 2,6-naphthalenedicarboxylic acid copolyester examples are disclosed. U.S. Pat. No. 4,000,239 and British Pat. No. 1,445,464 relate to processes for producing fibers consisting of 85 and 95 mol %, respectively, of poly(ethylene 2,6-naphthalenedicarboxylate) having improved mechanical and thermal properties. U.S. Pat. No. 3,616,832 discloses rubber articles reinforced with polyesters consisting of 95 mol % poly(ethylene 2,6-naphthalenedicarboxylate). No stilbene/naphthalene copolyesters are disclosed in these patents. Also it is noteworthy that none of these patents distinguish the isomers of stilbenedicarboxylic acid from one another. British Polymer Journal, 13, 55 (1981) discloses polymers based on trans-4,4'-stilbenedicarboxylic acid and 1,5-pentanediol, 1,6-hexanediol, 1,10-decanediol and 2,2-dimethyl 1,3-propanediol. No. 2,6-naphthalenedicarboxylic acid/ethylene glycol examples are disclosed.

This invention concerns copolyesters containing repeating units from about 90 to about 55 mol % 2,6-naphthalenedicarboxylic acid, about 10 to about 45 mol % trans-4,4'-stilbenedicarboxylic acid and ethylene glycol, said copolyesters having a melting point of about 350° C. or less and an inherent viscosity of about 0.4 or more. The repeating units from the 2,6-naphthalenedicarboxylic acid portion of the copolymer may be replaced with repeating units from up to about 15 mol % of other isometric naphthalenedicarboxylic acids, substituted naphthalenedicarboxylic acids or other aromatic dicarboxylic acids. The repeating units from the trans-4,4'-stilbenedicarboxylic acid portion of the copolymer may be replaced with repeating units from up to about 15 mol % of other isometric stilbenedicarboxylic acids. The repeating units from the ethylene glycol portion of the copolyester may be replaced with repeating units from up to about 15 mol % of another glycol containing 3 to 20 carbon atoms.

More particularly the compositions of this invention are prepared from 2,6-naphthalenedicarboxylic acid or its esters, trans-4,4'-stilbenedicarboxylic acid or its esters, and ethylene glycol. Examples of useful acid esters are dimethyl, diethyl, dipropyl, dibutyl, diphenyl, or any combination of these as mixed esters.

The repeating units from 2,6-naphthalenedicarboxylic acid portion of the polymer may be replaced with repeating units from up to 15 mol % of other isomeric naphthalenedicarboxylic acids such as 1,3-, 1,4-, 1,5-, 1,6-, or 2,7-isomers. In addition, methyl-, chloro-, or phenyl-substituted naphthalenedicarboxylic acids may be used. Unsubstituted 2,6-naphthalenedicarboxylic acid is preferred.

The repeating units from the trans-4,4'-stilbenedicarboxylic acid portion of the polymers may be replaced with repeating units from 15 mol % of an isomeric stilbenedicarboxylic acid. For example, 3,3'-, 2,2', or 3,4'-trans- or cis-stilbenedicarboxylic acid may be used. Additionally the aromatic portion of the polyesters may contain up to 15 mol % of other modifiers such as terephthalic acid, 1,4-cyclohexanedicarboxylic acid or isophthalic acid.

The repeating units from the glycol portion of the polyester may be replaced with up to 15 mol % of repeating units from other glycols containing 3 to 20 carbons such as 1,2-propanediol, neopentyl glycol, 1,3-propanediol, 1,4-butanediol, 2-methyl-1,4-butanediol, 1,6-hexanediol, and 1,4-cyclohexanedimethanol.

The repeating units from the trans-4,4'-stilbenedicarboxylic acid content of the polyesters may be 10 to 45 mol %, preferably 10 to 40 mol %, such that the sum of the total dicarboxylic acid content of the polyesters is 100 mol %. The polymer should melt below about 350° C. so the polyesters can be processed on conventional equipment. The inherent viscosities of the polyesters are at least 0.4 and preferably at least 0.6. The polymers are prepared in the melt or by solid-phase polymerization of ground polymer or by a combination of these processes.

The following examples illustrate the unobvious molding plastic and fiber properties of copolyesters of 2,6-naphthalenedicarboxylic acid, trans-4,4'-stilbenedicarboxylic acid, and ethylene glycol.

This invention can be further illustrated by the following examples of preferred embodiments thereof, although it will be understood that these examples are included merely for purposes of illustration and are not intended to limit the scope of the invention unless otherwise specifically indicated.

All inherent viscosities are determined at 25° C. in 40/35/25 (wt/wt/wt) p-chlorophenol/tetrachloroethane/phenol (PCLOL) at a concentration of 0.1 g/100 mL.

The polymers are dried overnight in a vacuum oven at 110° C. and injection molded in a one-ounce Watson-Stillman molding machine to give $2\frac{1}{2} \times \frac{3}{8} \times 1/16$ inch tensile bars and $5 \times \frac{1}{2} \times \frac{1}{8}$ inch flexure bars. ASTM procedures are used to measure flexural modulus (D790) and tensile strength (D1708).

Figure 2:
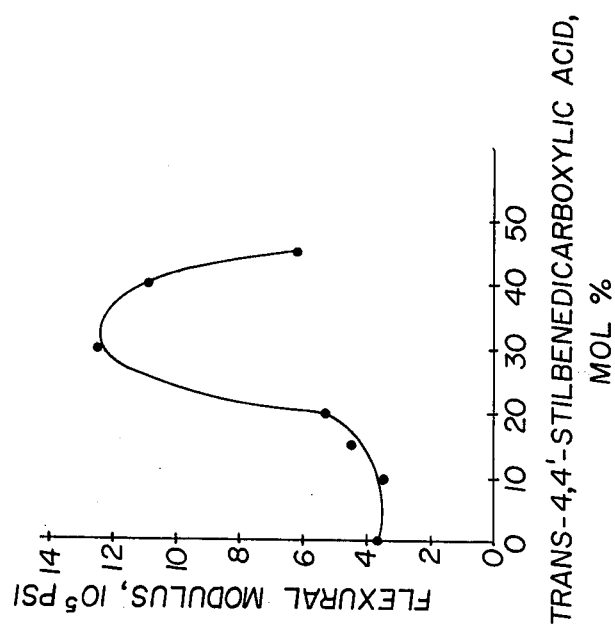
FIG. 2 is a plot showing the effect of trans-4,4'-stilbenedicarboxylic acid content on the flexural modulus of injection molded poly(ethylene 2,6-naphthalenedicarboxylate) copolyesters.
Figure 1:
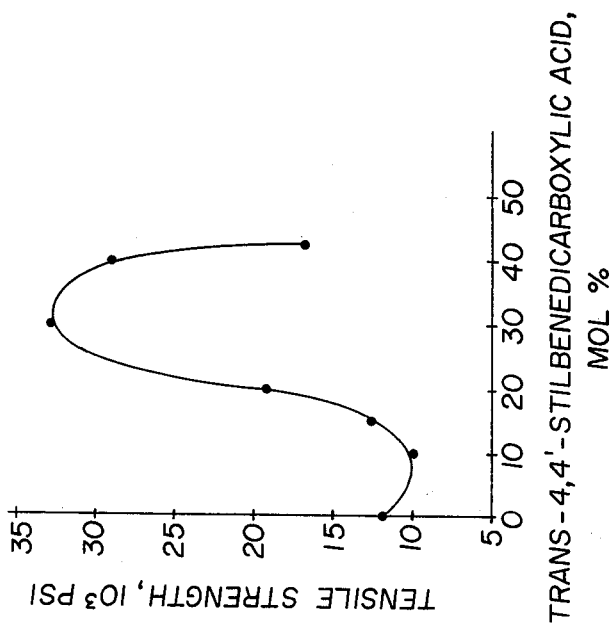
FIG. 1 is a plot showing the effect of trans-4,4'-stilbenedicarboxylic acid content on the tensile strength of injection molded poly(ethylene 2,6-naphthalenedicarboxylate) copolyesters.

FIGS. 1 and 2 and data in Table 1 (taken from Examples 1–9) show the unobvious effect of trans-4,4'-stilbenedicarboxylic acid (SDA) content on the tensile strength and flexural modulus of poly(ethylene 2,6-naphthalenedicarboxylate).

The polymers are spun on an Instron melt rheometer, Model 3211, through a capillary (diameter 0.014 inch) equipped with a capillary heater. The design of the capillary allows use of a filtering system consisting of 0.4 g 40/60 mesh sand supported by two 60-micron screens. Tensile properties of the fibers are determined using a standard one-inch gauge length for single filaments. Fibers are glued to a paper substrate prior to tensile testing to reduce damage to the single filaments from the clamps.

TABLE 1

Effect of trans-4,4'-Stilbene-dicarboxylic Acid Content on the Tensile Properties of Injection Molded Poly(ethylene 2,6-naphthalenedicarboxylate)*

| Stilbene Dicarboxylic Acid, Mol % | I.V. | Tensile Strength, $10^3$ psi | Flexural Modulus, $10^5$ psi |
|---|---|---|---|
| 0 | 0.96 | 12.0 | 3.7 |
| 10 | 0.92 | 10.0 | 3.5 |
| 15 | 0.98 | 12.7 | 4.5 |
| 20 | 0.92 | 19.2 | 5.3 |
| 30 | 0.95 | 32.9 | 12.5 |
| 40 | 2.10 | 29.0 | 10.9 |
| 45 | 1.24 | 16.9 | 6.2 |

*Polymers were molded on a one-ounce Watson-Stillman molding machine.

EXAMPLE 1

This example illustrates the preparation and molding of a polyester of 100 mol % 2,6-naphthalenedicarboxylic acid and 100 mol % ethylene glycol.

A mixture of 244.0 g (1.0 mol) dimethyl 2,6-naphthalenedicarboxylate and 186.0 g (3.0 mols) ethylene glycol, 0.054 g zinc acetate, and 0.036 g titanium isopropoxide is placed in a 1-liter flask equipped with an inlet for nitrogen, a metal stirrer, and a short distillation column. The flask and contents are heated at 190° C. for 3 hours, at 220° C. for ½ hour, at 240° C. for ½ hour, and at 280° C. for 20 to 30 minutes. A vacuum of 0.5 mm is gradually applied over the next 5 to 10 minutes while the temperature is being increased to 300° C. After about 15 minutes at 300° C. under full vacuum, the reaction is stopped to give a high melt viscosity, crystalline polymer having an inherent viscosity of 0.96.

The polymer is ground to pass a 3-mm screen, dried at 110° C. in a vacuum oven, and then injection molded at 280° C. Molded bars of the polymer have a tensile strength of 12,000 psi and a flexural modulus of $3.7 \times 10^5$ psi.

EXAMPLE 2

This example illustrates the preparation and molding of a copolyester of 90 mol %, 2,6-naphthalenedicarboxylic acid, 10 mol % trans-4,4'-stilbenedicarboxylic acid, and 100 mol % ethylene glycol.

A mixture of 219.6 g (0.9 mol) dimethyl 2,6-naphthalenedicarboxylate, 29.6 g (0.1 mol) dimethyl trans-4,4'-stilbenedicarboxylate, 186 g (3.0 mols) ethylene glycol, 0.054 g zinc acetate, and 0.037 g titanium isopropoxide is placed in a 1-liter flask equipped with an inlet for nitrogen, a metal stirrer, and a short distillation column. The flask and contents are heated at 190° C. for 3 hours, at 220° C. for ½ hour, at 240° C. for ½ hour, and at 280° C. for 20 to 30 minutes. A vacuum of 0.5 mm is gradually applied over the next 5 to 10 minutes while the temperature is increased to 300° C. After about 15 minutes at 300° C. under full vacuum, the reaction is stopped. A high melt viscosity crystalline polymer is obtained with an I.V. of 0.92.

The polymer is ground to pass a 3-mm screen, dried at 110° C. in a vacuum oven, and then injection molded at 280° C. Molded bars have a tensile strength of 10,000 psi and a flexural modulus of $3.5 \times 10^5$ psi.

EXAMPLE 3

A polyester of 85 mol % 2,6-naphthalenedicarboxylic acid, 15 mol % trans-4,4'-stilbenedicarboxylic acid, and 100 mol % ethylene glycol is prepared as in Example 2 to an I.V. of 0.98.

This polymer is molded at 280° C. to give molded bars with a tensile strength of 12,700 and a flexural modulus of $4.5 \times 10^5$ psi.

EXAMPLE 4

A polyester of 80 mol % 2,6-naphthalenedicarboxylic acid, 20 mol % trans-4,4'-stilbenedicarboxylic acid and 100 mol % ethylene glycol is prepared as in Example 2 to an I.V. of 0.92.

The polymer is molded at 280° C. to give molded bars with a tensile strength of 19,200 psi and a flexural modulus of $5.3 \times 10^5$ psi.

EXAMPLE 5

A polyester of 70 mol % 2,6-naphthalenedicarboxylic acid, 30 mol % trans-4,4'-stilbenedicarboxylic acid and 100 mol % ethylene glycol is prepared as in Example 2 to an I.V. of 0.95.

The polymer is molded at 280° C. to give molded bars with a tensile strength of 32,000 psi and a flexural modulus of $12.5 \times 10^5$.

EXAMPLE 6

This example illustrates the preparation and molding of a copolyester of 60 mol % acid, 40 mol % trans 4,4'-stilbenedicarboxylic acid and 100 mol % ethylene glycol.

A mixture of 131.8 g (0.54 mol) dimethyl 2,6-naphthalenedicarboxylate, 106.6 g (0.36 mol) dimethyl trans-4,4'-stilbenedicarboxylate, 167.4 g (2.7 mols) ethylene glycol and 0.14 g titanium isopropoxide is placed in a 1-liter flask equipped with an inlet for nitrogen, a metal stirrer and a short distillation column. The flask and contents are heated at 190° C. for 3 hours, at 220° C. for ½ hour, at 240° C. for ½ hour and at 280° C. for ½ hour. A vacuum of 0.5 mm is gradually applied while the temperature is increased to 310° C. After ~10 minutes at 310° C. under full vacuum, the reaction is stopped. A clear, high melt viscosity, crystalline polymer is obtained with an I.V. of 0.60.

The polymer is ground to pass a 3 mm screen and solid phase polymerized at 110° C. for 1 hour, at 180° C. for ½ hour and then at 240° C. for 4 hours to give a polymer with an I.V. of 2.1. The solid phased polymer is injection molded at 310° C. to give molded bars with tensile strength of 29,000 psi flexural modulus of $10.9 \times 10^5$ psi.

EXAMPLE 7

A polyester of 55 mol % 2,6-naphthalenedicarboxylic acid, 45 mol % trans 4,4-stilbenedicarboxylic acid and 100 mol % ethylene glycol is prepared as in Example 7 to an I.V. of 0.70. The polymer is ground to pass a 3 mm screen and solid phase polymerized at 110° C. for 1 hour, at 180° C. for 1 hour and at 240° C. for 2¼ hours.

The solid phased polymer is injection molded at 310° C. to give molded bars with a tensile strength of 16,900 psi and a flexural modulus of $6.2 \times 10^5$ psi.

EXAMPLE 8

A control polyester of 100 mol % 2,6-naphthalenedicarboxylic acid and 100 mol % ethylene glycol is prepared as in Example 1 to an I.V. of 0.53. It is solid-phase polymerized to 0.82 I.V. in a manner similar to that described in Example 6. The polymer is spun on the Instron melt rheometer described earlier at 300° C. and taken up at 3000 feet/minute to give ass-pun fibers of 1.5 denier, with 8 gram/denier tenacity and with 152 gram/denier modulus.

EXAMPLE 9

A polyester of 90 mol % 2,6-naphthalenedicarboxylic acid, 10 mol % trans-4,4'-stilbenedicarboxylic acid, and 100 mol % ethylene glycol is prepared as in Example 2 to an I.V. of 0.70. The polymer is spun on the Instron melt rheometer described earlier at 312° C. and taken up at 3000 feet/minute to give as-spun fibers of 1.5 denier, with 8 gram/denier tenacity, and with 212 gram/denier modulus. This modulus is ~30% higher than that of the unmodified poly(ethylene 2,6-naphthalenedicarboxylate) fiber described in Example 8.

We claim:

1. A copolyester containing repeating units prepared from about 90 to about 55 mol % 2,6-naphthalenedicarboxylic acid or esters thereof, about 10 to about 45 mol % trans-4,4'-stilbenedicarboxylic acid or esters thereof and ethylene glycol, said copolyester having a melting point of about 350° C. or less and an inherent viscosity of about 0.4 or more determined at 25° C. in 40/35/25 (wt/wt/wt) p-chlorophenol/tetrachloroethane/phenol (PCLOL) at a concentration of 0.1 g/100 mL.

2. A copolyester of claim 1 wherein up to about 15 mol % of the repeating units prepared from the 2,6-naphthalenedicarboxylic acid or esters thereof are replaced by repeating units prepared from other isomeric naphthalenedicarboxylic acids, methyl-, chloro-, or phenyl substituted naphthalenedicarboxylic acids, other aromatic dicarboxylic acids, or esters thereof.

3. Copolyester of claim 1 wherein up to about 15 mol % of the repeating units prepared from the trans-4,4'-stilbenedicarboxylic acid or esters thereof are replaced with up to about 15 mol % of other isomeric stilbenedicarboxylic acids or esters thereof.

4. Copolyester of claim 1 wherein up to about 15 mol % of the repeating units prepared from ethylene glycol are replaced by repeating units prepared from another glycol containing 3 to 20 carbon atoms.

* * * * *